June 15, 1948. W. MAXWELL 2,443,261
TRACTION INCREASING WHEEL ATTACHMENT
Filed Aug. 13, 1946 2 Sheets-Sheet 1

Walter Maxwell
Inventor

By [signature]
Attorneys

June 15, 1948.  W. MAXWELL  2,443,261
TRACTION INCREASING WHEEL ATTACHMENT
Filed Aug. 13, 1946  2 Sheets-Sheet 2

Walter Maxwell
Inventor

By CASnow Co.
Attorneys.

Patented June 15, 1948

2,443,261

UNITED STATES PATENT OFFICE 2,443,261

TRACTION INCREASING WHEEL ATTACHMENT

Walter Maxwell, Marshfield, Wis.

Application August 13, 1946, Serial No. 690,207

2 Claims. (Cl. 301—47)

This invention relates to a traction attachment for motor vehicle wheels, the primary object of the invention being to provide a device of this character which may be readily and easily secured to motor vehicle wheels to increase the traction of the wheels, when the wheels are operating on slippery or muddy surfaces.

An important object of the invention is to provide a device of this character which will be carried by the motor vehicle wheels at all times, means being provided for throwing the traction spikes or blades into and out of operation at will.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred forms of the invention have been shown.

Referring to the drawings

Figure 1:
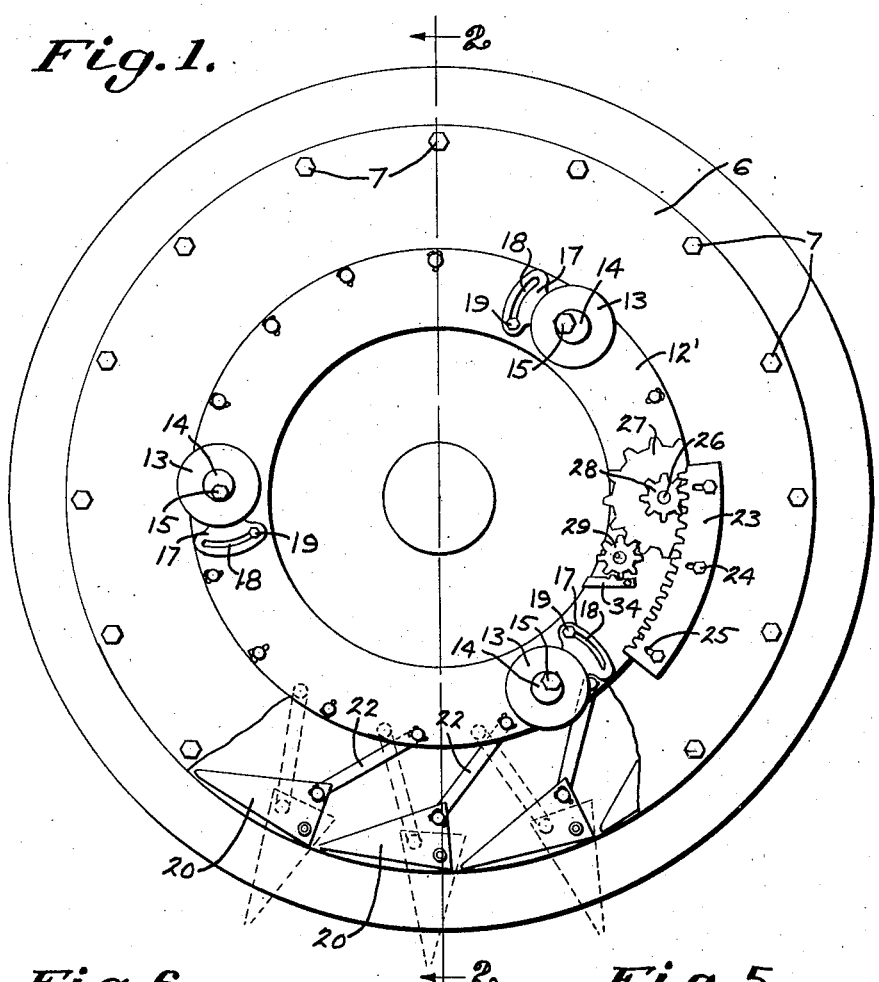
Figure 1 is a side elevational view of a motor vehicle wheel, equipped with a traction increasing device constructed in accordance with the invention.
Figure 6:
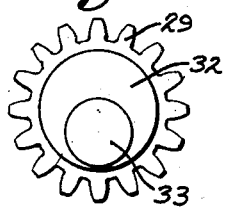
Figure 6 is an enlarged detailed view of the elongated gear over which the crank handle shown by Figure 5 is positioned to operate the spike supporting ring.
Figure 5:
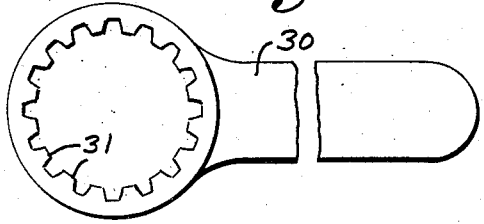
Figure 5 is an enlarged detailed view illustrating the handle which is used in rotating the spike supporting ring.
Figure 2:
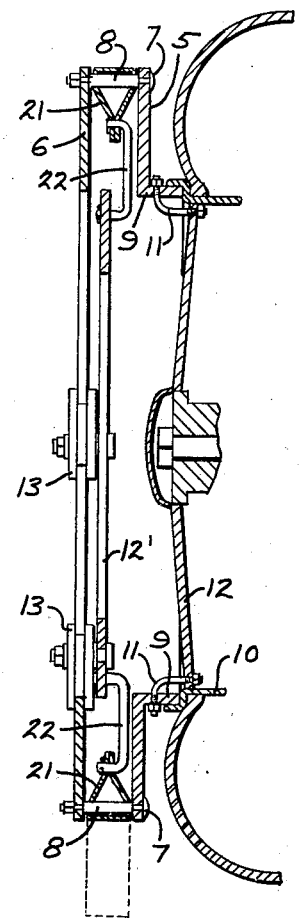
Figure 2 is a sectional view taken on line 2—2 of Figure 1.
Figure 3:
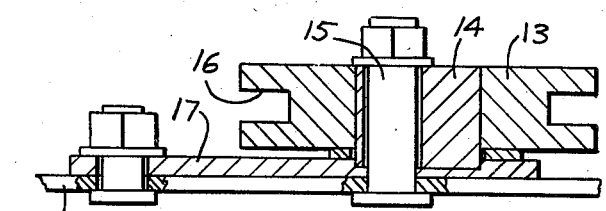
Figure 3 is an enlarged fragmental sectional view, illustrating one of the grooved rollers that provide a support for the inner spike supporting ring of the attachment.
Figure 4:
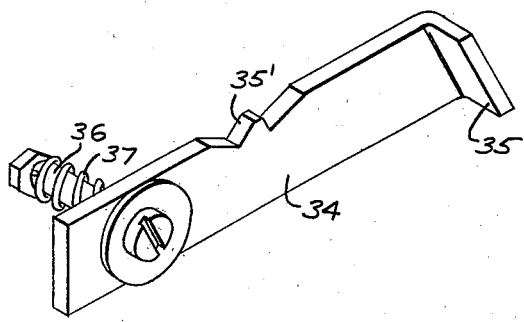
Figure 4 is a perspective view of a gear-locking arm by means of which the gear that operates the spike supporting ring is held against movement after adjustment.

Referring to the drawings in detail, the attachment comprises a main section embodying the inner supporting ring 5 and the outer ring 6, the rings 5 and 6 being held in spaced relation with respect to each other, by means of the bolts 7 on which the spacers 8 are positioned, the spacers 8 having their ends contacting with the inner surfaces of the rings 5 and 6 as clearly shown by Figure 2 of the drawings.

The inner supporting ring 5 is formed with a laterally extended angular flange 9 that is adapted to fit within the outer surface of the felloe 10 where it is secured in position by means of the bolts 11 that extend through openings in the wheel 12, the outer ends of the bolts extending through openings formed in the annular flange 9.

Mounted between the rings 5 and 6 is a ring 12' which is of much smaller diameter than the rings 5 and 6, so that the outer edge of the ring 12' will lie in a line with the inner edges of the rings 5 and 6. Secured to the ring 12', are grooved rollers 13 which are mounted on the eccentric bearings 14 that in turn are mounted on the bolts 15, the grooves 16 of the rollers 13 being constructed to receive the inner edge of the outer ring 6, providing bearings for the ring 12' to rotatably support the ring 12' with respect to the rings 5 and 6. The bearings 14 are mounted on the adjustable plates 17 that are formed with elongated arcuate shaped openings 18 in which the bolts 19 operate, the bolts 19 being secured to the ring 12'. Due to this construction, it will be seen that by moving the adjustable plates 17, the grooved rollers may be adjusted toward and away from the ring 6 to insure the proper operation of the device.

The reference character 20 indicates cleats or spikes which are pivotally mounted on the spacers 8, between the inner and outer rings 5 and 6, the cleats or spikes being formed with inwardly extended ears 21, which are formed with openings to receive the connecting rods 22 that have one of their right-angled ends extending through the ears 21 associated therewith, while the opposite ends thereof extend through openings in the ring 12'.

It will be seen that when the ring 12' is rotated in one direction, the cleats or spikes 20 will be extended beyond the rings 5 and 6, and when the ring 12' is moved in the opposite direction, these spikes will be retracted to positions below the usual tire tread surface.

Secured to the outer ring 6 is an arcuate shaped rack bar 23 which is held in position by means of the bolts 24 that operate in the elongated openings 25 so that the rack bar 23 may be adjusted to extend the teeth thereof below or beyond the inner edge of the ring 6. Mounted on the ring 12' is a shaft 26 on which the large gear 27 is mounted, while at the outer end of the shaft 26 is mounted the smaller gear 28, the gear 28 being designed to cooperate with the teeth of the rack bar 23 to rotate the ring 12' as the shaft 26 and gears mounted thereon are rotated. Associated with the gear 28 is the gear 29 which is provided with elongated teeth for the reception of the crank handle 30 which is formed with teeth 31 that are designed to fit the teeth of the gear 29 to rotate the gear 29 which in turn rotates the gear 27, shaft 26 and gear 28. This gear 29 is mounted on the eccentrically supported bearing 32 that moves around the shaft 33, to the end that the bearing 32 may be adjusted to regulate the position of the gear 29.

Secured to the ring 12' is a movable locking bar 34 which has a right-angled end 35 adapted to fit over the inner edge of the ring 12', the bar 34 being formed with teeth 35' to engage the teeth of the gear 29 and prevent rotary movement thereof. The bar 34 is mounted for movement longitudinally of the bolt 36 that is secured to the ring 12' there being provided a coiled spring 37 positioned on the bolt, normally urging the bar 34 outwardly, or to its locking or securing position. When it desired to rotate the gear 29, the bar 34 is forced inwardly against the action of the spring 37, where it disengages the gear 29, allowing the gear 29 to be rotated by the removable crank handle 30.

It might be further stated that the cleats or spikes 20 are substantially triangular in shape, to the end that they are supported adjacent to one of the corners thereof, the opposite corner being formed with an opening to receive the connecting rods to the end that when the connecting rods are rotated, the cleats or spikes will be rotated to extend them or retract them, according to the direction of rotation of the gearing.

From the foregoing it will be seen that due to the construction shown and described, I have provided an attachment which may be readily positioned on a motor vehicle wheel to provide added traction for the wheel by extending the spikes or cleats beyond the periphery of the wheel, to dig into the ground surface as the wheels rotate.

Having thus described the invention what is claimed is:

1. A traction attachment for motor vehicles comprising spaced outer and inner ring sections, means for securing the ring sections to a motor vehicle wheel, traction spikes pivotally mounted between the ring sections, an inner movable ring member, grooved rollers adjustably mounted on the movable ring member and adapted to accommodate the inner edge of the outer ring section supporting the movable ring member, rods connecting the traction spikes and inner movable ring member, and means for rotating the inner movable ring member whereby the rods are operated extending or retracting the spikes.

2. A traction attachment for motor vehicles comprising spaced outer and inner ring sections, means for securing the ring sections to a motor vehicle wheel, traction spikes embodying substantially triangular shaped members pivotally mounted between the ring sections adjacent to one corner of the spikes, an inner movable ring member, grooved rollers mounted on the movable ring member and adapted to receive the inner edge of the outer ring section, supporting the movable ring member, rods connecting the traction spikes at points adjacent to the pivots thereof, the rods being also connected with the inner movable ring, and means for rotating the inner movable ring member whereby the spikes are pivoted and extended beyond the tread of the wheel on which the attachment is positioned, or retracted to points spaced inwardly from the tread of the wheel.

WALTER MAXWELL.

REFERENCES CITED

The following references are of record in the file of this patent:

UNITED STATES PATENTS

| Number | Name | Date |
|---|---|---|
| 1,018,545 | Craig | Jan. 23, 1912 |
| 1,236,109 | Rose | Aug. 7, 1917 |
| 1,881,135 | Schmidt | Oct. 4, 1932 |
| 2,041,460 | Donderer | May 19, 1936 |

FOREIGN PATENTS

| Number | Country | Date |
|---|---|---|
| 485,403 | Great Britain | May 19, 1936 |